United States Patent [19]

Sato et al.

[11] Patent Number: 5,637,243
[45] Date of Patent: Jun. 10, 1997

[54] LASER CUTTING MACHINE

[75] Inventors: Kiyoshi Sato; Hajime Osanai, both of Aichi, Japan

[73] Assignee: Mitsubishi Denki Kabushiki Kaisha, Tokyo, Japan

[21] Appl. No.: 312,805

[22] Filed: Sep. 27, 1994

[30] Foreign Application Priority Data

Sep. 27, 1993  [JP]  Japan ..................... 5-240160

[51] Int. Cl.⁶ .......................................... B23K 26/00
[52] U.S. Cl. .......................... 219/121.67; 219/121.74; 219/121.78; 219/121.82
[58] Field of Search ................ 219/121.67, 121.72, 219/121.74, 121.75, 121.78, 121.8, 121.82; 359/487, 501, 857, 861, 871

[56] References Cited

U.S. PATENT DOCUMENTS

| | | | |
|---|---|---|---|
| 4,364,535 | 12/1982 | Itoh et al. | 248/123.2 |
| 4,571,149 | 2/1986 | Soroka et al. | 414/750 |
| 4,659,902 | 4/1987 | Swensrud et al. | 219/121.78 |
| 4,746,202 | 5/1988 | Perilloux et al. | |
| 4,775,289 | 10/1988 | Kazerooni | 414/735 |
| 4,808,791 | 2/1989 | Puozzo et al. | 219/121.78 |
| 4,910,378 | 3/1990 | Arai | 219/121.74 |
| 5,128,512 | 7/1992 | Seki | 219/121.82 |
| 5,192,848 | 3/1993 | Miyakawa et al. | 219/121.82 |

FOREIGN PATENT DOCUMENTS

| | | |
|---|---|---|
| 3638678 | 4/1987 | Germany. |
| 58-134289 | 9/1983 | Japan. |
| 59-61585 | 4/1984 | Japan. |
| 61-242782 | 10/1986 | Japan. |
| 61-296985 | 12/1986 | Japan. |
| 62-263889 | 11/1987 | Japan. |
| 63-16894 | 1/1988 | Japan. |
| 155076 | 11/1989 | Japan. |
| 216199 | 4/1990 | Japan. |
| 2104488 | 4/1990 | Japan. |
| 4327394 | 11/1992 | Japan. |
| 577075 | 3/1993 | Japan. |
| 677332 | 5/1991 | Switzerland ............ 219/121.67 |

*Primary Examiner*—Teresa J. Walberg
*Assistant Examiner*—Gregory L. Mills
*Attorney, Agent, or Firm*—Sughrue, Mion, Zinn, Macpeak & Seas

[57] ABSTRACT

A laser cutting machine having a cutting head that is positionable in X-, Y- and Z- directions and which comprises a laser oscillator for supplying a beam via a plurality of mirrors to the cutting head and onto a workpiece mounted on a flat table surface with rising rollers or a retractable rotatable support in the table. The locations and center-of-gravity positions of the machine components are disposed for optimum maneuverability and balance. The plurality of mirrors in the optical system have a first bend mirror, that is a precision-adjustable, circular-polarizing mirror, and a plurality of subsequent bend mirrors that are disposed to counterbalance any resulting phase shift amounts. The subsequent mirrors can be ES or PS coated mirrors and can be accompanied by convex, concave, collimating, etc. mirrors and lenses as needed.

13 Claims, 11 Drawing Sheets

LASER CUTTING MACHINE

BACKGROUND OF THE INVENTION

1. Field of the Invention

The present invention relates to a light-scanning laser cutting machine in which a cutting head is moved to cut a workpiece.

2. Description of the Background Art

FIG. 19 is a diagrammatic view showing a conventional cantilever-type, light-scanning laser cutting machine disclosed in Japanese Laid-Open Utility Model Publication No. SHO58-134289, for example, and FIG. 20 is a plan view thereof. In these drawings, a Y arm 1 is movable in a Y-axis direction and a Y-axis rail 2 is disposed under the Y arm 1 with Y-axis rail supports 3 being oriented to hold the Y-axis rail 2. A laser beam 4 is gathered by a cutting head 5 and irradiates the beam onto a workpiece 6. Bend mirrors 7, which reflect the laser beam 4 to lead it to the cutting head 5, comprise a first bend mirror 7a and a second bend mirror 7b. A Y-axis bellows 8 is used to cover the beam path opening and drive of the Y arm 1 and a support plate 9 is fitted to the Y-axis rail supports 3 to hold the Y arm 1 and its drive and is movable in an X-axis direction. Also forming part of the machine are X-axis rails 10, X-axis rail supports 11 installed on the underside of the support plate 9 to hold the X-axis rails 10, and an X-axis bellows 12 which covers an X-axis direction drive. Finally, there is a cutting table 13 which retains the workpiece 6, a machine base 14 which supports all of the above components, a cutting chamber 15 and a laser oscillator 16 which outputs the laser beam 4.

In operation, the Y arm 1 is allowed to move in the Y-axis direction by the Y-axis rail 2 installed thereunder and by the Y-axis rail supports 3 installed on the support plate 9. The support plate 9 holds the Y arm 1 and its drive and is allowed to move in the X-axis direction by the X-axis rails 10 installed to the machine base 14, which supports all components, and by the X-axis rail supports 11 installed on the underside of the support plate 9.

In the meantime, the laser beam 4 output by the laser oscillator 16 is reflected by the first bend mirror 7a, which is contained in the Y arm 1 and is fixed to the support plate 9 (and therefore does not move if the Y arm 1 moves in the Y-axis direction), and then by the second bend mirror 7b fitted to the front end of the Y arm 1, and is led to the cutting head 5 installed under the second bend mirror 7b. The laser beam 4 is gathered by the cutting head 5 and irradiated on the workpiece 6 which is held on the cutting table 13 secured by the machine base 14.

By moving the Y arm 1 in the Y-axis direction and the support plate 9 in the X-axis direction at this time, the cutting head 5 can be moved in any axis direction on an X–Y plane, whereby the workpiece 6 can be cut into any desired shape.

Also, the Y bellows 8 is fitted to the opening and drive of the Y arm 1 and the X bellows 12 fitted to the X-axis direction drive to provide protection from dust.

Further, the movable area of the Y arm 1 and the whole cutting area are enclosed by the cutting chamber 15 to provide safety measures.

To move the cutting head in the Y-axis direction in the conventional cantilever-type light-scanning laser cutting machine shown in FIG. 19 constructed as described above, the Y arm itself must be moved, and because of the heavy weight of the moving section, vibration during the Y-axis direction movement increases, giving adverse influence on cutting accuracy.

Moreover, since the moving range of the Y arm in the Y-axis direction is quite large, the Y arm offers the possibility that it will collide with a human body or other object, posing a problem in safety.

For these reasons, a laser cutting machine which can solve such problems, i.e., a laser cutting machine in which only the cutting head is disposed movably in the Y-axis direction on a Y arm that is movable in the X-axis direction, is disclosed in Japanese Laid-Open Patent Publication No. SHO61-242782, Japanese Laid-Open Patent Publication No. HEI5-77075.

As an alternative conventional example, a laser cutting machine has a laser oscillator for oscillating a laser beam, and a first bend mirror for receiving the laser beam which is disposed on a first plane intersecting the axis line of the laser beam, a second bend mirror which is opposed to the first bend mirror on the intersecting portion of the first plane and a second plane intersecting the first plane, a third bend mirror which is opposed to the second bend mirror on the intersecting portion of the second plane and a third plane intersecting the second plane, a fourth bend mirror which is opposed to the third bend mirror on the intersecting portion of the third plane and a fourth plane intersecting the third plane, and a fifth bend mirror which is opposed to the fourth bend mirror on the intersecting portion of the fourth plane and a fifth plane intersecting the fourth plane to form a beam axis on each of the first, second, third, fourth and fifth planes. In that system, a beam axis distance between the second bend mirror and third bend mirror and a beam axis distance between the fourth bend mirror and fifth bend mirror change. The system is disclosed in Japanese Laid-Open Patent Publication No. SHO63-16894.

As an alternative conventional example, a laser cutting machine, in which a mirror for receiving a linear-polarized laser beam output by a laser oscillator is a circular-polarizing mirror, is disclosed in Japanese Laid-Open Patent Publication No. SHO61-296985, etc.

As a further alternative conventional example, a laser cutting machine in which a laser cutting head equipped with a bend mirror and a condenser is moved to change the length of a laser beam between a laser oscillator and a cutting point where a workpiece is laser-cut, wherein a collimating apparatus movable by a drive motor is provided between the laser oscillator and the laser cutting head to nearly uniform the diameter of the laser beam and the focal distance of the condenser, is disclosed in Japanese Laid-Open Patent Publication No. HEI4-327394.

Among the conventional laser cutting machines designed as described above, the laser cutting machines disclosed in Japanese Laid-Open Patent Publication No. SHO61-242782, Japanese Laid-Open Patent Publication No. HEI5-77075, etc., can solve said disadvantages of the machine shown in FIG. 19. However, because of the center-of-gravity position of the Y arm is always located outside the pair of X-axis rails, a large load difference and bending moment is applied to the rails are large. Consequently, an unusual stress and strain are provided, and a problem for the lives of the rails and rail supports will result.

Also, the laser cutting machines disclosed in Japanese Laid-Open Patent Publication No. SHO63-16894, Japanese Laid-Open Patent Publication No. SHO61-296985, etc., do not have a means for transmitting the circular-polarized laser beam to the cutting point without reducing a circular polarization factor, whereby the circular polarization factor is reduced during the transmission of the circular-polarized laser beam to the cutting point.

Further, the laser cutting machine disclosed in Japanese Laid-Open Patent Publication No. HEI4-327394, etc., requires the collimating apparatus to be moved by the drive motor, whereby the means for reducing a beam diameter change in the movable range of the cutting head becomes complicated.

SUMMARY OF THE INVENTION

Accordingly, it is an object of the present invention to solve these problems by providing a cantilever-type laser cutting machine design which increases the lives of the rails and rail supports.

It is another object of the present invention to provide a laser cutting machine which can transmit a circular-polarized laser beam to a cutting point without reducing the circular polarization factor.

It is a further object of the present invention to provide a laser cutting machine which allows a beam diameter change in the movable range of a cutting head to be reduced by a simple arrangement.

It will be apparent that as described below, the present invention achieves a laser cutting machine which comprises a laser oscillator, an arm provided movably in the direction of a first axis on a pair of rails disposed on the first axis, and a cutting head provided movably in the direction of a second axis perpendicular on a plane to the first axis on rails disposed on said arm, and in which a first bend mirror and a second bend mirror for receiving the laser beam output by said laser oscillator are provided on said first axis, a third bend mirror and a fourth bend mirror are provided on said arm, and a fifth bend mirror is provided on said cutting head to constitute a laser beam path, and the center-of-gravity position of said arm is located between said pair of rails disposed on the first axis, whereby the load difference and load moment of the arm, etc., applied to the rails for supporting the arm can be reduced to improve the lives of said rails and rail supports.

It will also be apparent that the present invention achieves the laser cutting machine wherein the first bend mirror for receiving first the laser beam output by the laser oscillator is at least supported movably in the direction of a third axis perpendicular to the second axis, whereby the first bend mirror can be moved to match the beam axis height of the laser oscillator, the laser oscillator can be leveled easily during installation, and the machine can easily respond to different outputs and different beam axis heights.

It will also be apparent that the present invention achieves a laser cutting machine wherein a rotary table is provided outside the movable range of the cutting head, whereby even a cylindrical workpiece can be laser-cut easily without interfering with the cutting head. The machine also provides an effect that the rotary table does not narrow the cutting area at the time of cutting a flat workpiece.

It will also be apparent that the present invention achieves a laser cutting machine which further comprises means for moving up/down or sliding a rotary table body, whereby the rotary table body can be retreated so that when a large workpiece is placed on the cutting table, it can be loaded/unloaded without hindrance.

It will also be apparent that the present invention achieves a laser cutting machine, wherein a cutting table is provided with a rising roller conveyor, whereby the workpiece placed on the cutting table can be moved easily.

It will also be apparent that the present invention achieves a laser cutting machine which further comprises means for driving the roller of the rising roller conveyor, whereby the loading/unloading of the workpiece placed on the cutting table can be automated and further this laser cutting machine can be employed as part of a Factory Automation production line.

It will also be apparent that the present invention achieves a laser cutting machine which comprises a laser oscillator for oscillating a linear-polarized laser beam, in which a first bend mirror for receiving the laser beam is disposed on a first plane intersecting the axis line of said laser beam, a second bend mirror is opposed to the first bend mirror on the intersecting portion of said first plane and a second plane intersecting said first plane, a third bend mirror is opposed to the second bend mirror on the intersecting portion of said second plane and a third plane intersecting said second plane, a fourth bend mirror is opposed to the third bend mirror on the intersecting portion of said third plane and a fourth plane intersecting said third plane, and a fifth bend mirror is opposed to the fourth bend mirror on the intersecting portion of said fourth plane and a fifth plane intersecting said fourth plane to form a beam axis on each of said first, second, third, fourth and fifth planes, and in which a beam axis distance between said second bend mirror and third bend mirror and a beam axis distance between said fourth bend mirror and fifth bend mirror change, wherein said first bend mirror is a circular-polarizing mirror and said second to fifth bend mirrors are disposed to counterbalance phase shift amounts specific to the bend mirrors, whereby the laser beam circular-polarized by the first bend mirror for ease of circular polarization factor adjustment, beam axis adjustment, etc., can be transmitted to the cutting head without its circular polarization factor being reduced.

It will also be apparent that the present invention achieves a laser cutting machine wherein the first bend mirror is supported by X–Y travel adjustment mechanisms, whereby the laser beam can be irradiated at the center of the second bend mirror with the circular polarization factor maintaining a desired precise angle.

It will also be apparent that the present invention achieves a laser cutting machine wherein the second to fifth bend mirrors are ES or PS coated mirrors, whereby the circular-polarized laser beam can be transmitted to the cutting head, without its circular polarization factor being reduced, and with output damping decreased during transmission.

It will also be apparent that the present invention achieves a laser cutting machine which comprises a laser oscillator for oscillating a laser beam, in which a first bend mirror for receiving the laser beam is disposed on a first plane intersecting the axis line of said laser beam, a second bend mirror is opposed to the first bend mirror on the intersecting portion of said first plane and a second plane intersecting said first plane, and a third bend mirror is opposed to the second bend mirror on the intersecting portion of said second plane and a third plane intersecting said second plane to form a beam axis on each of said first and second planes, and in which a cutting head is moved to change a beam axis distance, wherein a collimation lens or a collimation mirror is disposed in a position where the laser beam is focused near the middle of the movable range of the cutting head, whereby the beam diameter change in the movable range of the cutting head is extremely small despite the simple arrangement.

It will further be apparent that the present invention achieves a laser cutting machine wherein a concave lens or a convex lens is installed between the beam outlet of the laser oscillator and the collimation lens or the collimation

DESCRIPTION OF THE PREFERRED EMBODIMENTS

Embodiment 1

Figure 1:
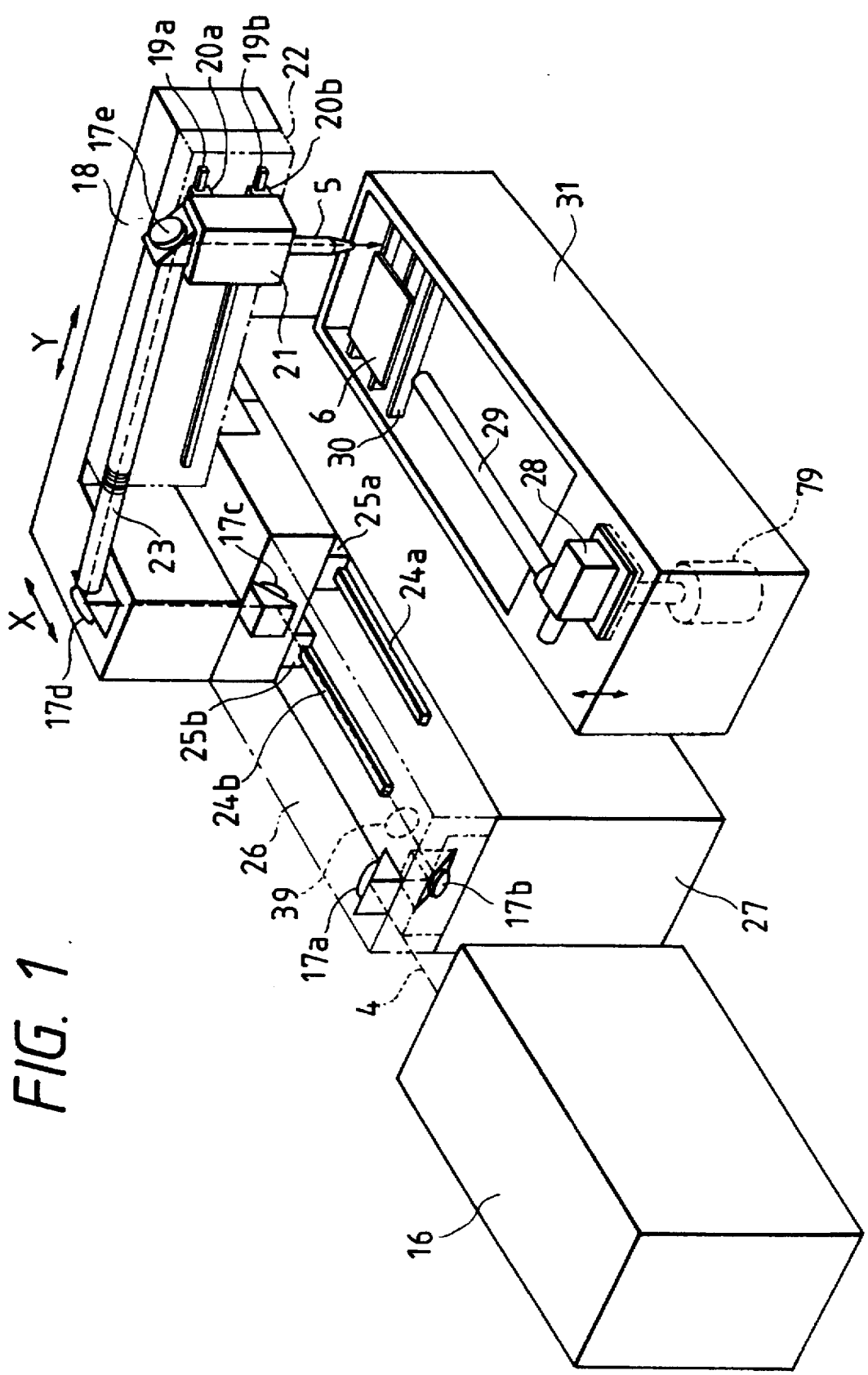
FIG. 1 is a perspective view showing a whole light-scanning laser cutting machine concerned with a first embodiment of the present invention.
Figure 2:
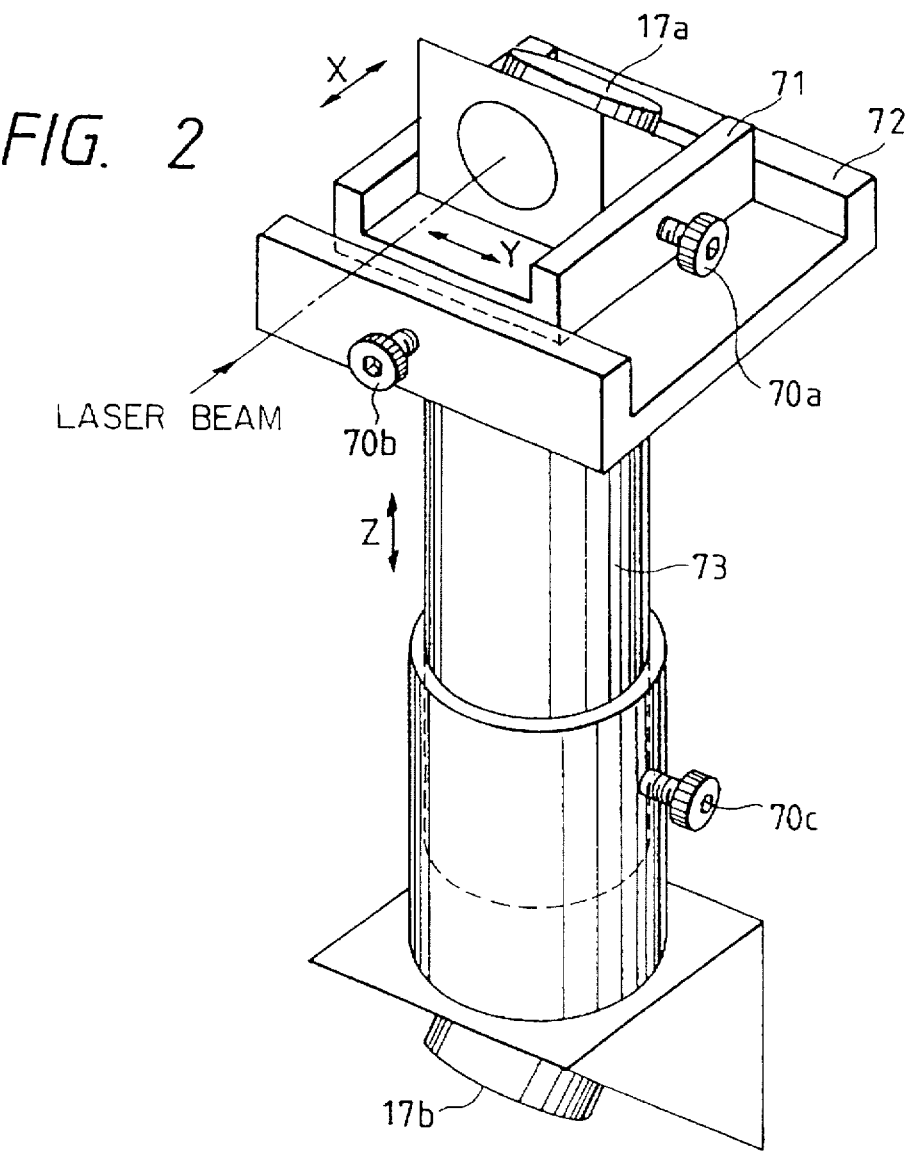
FIG. 2 is a perspective view showing the details of X-, Y- and Z-axis direction moving mechanisms for a first bend mirror concerned with a first embodiment of the present invention.
Figure 3:
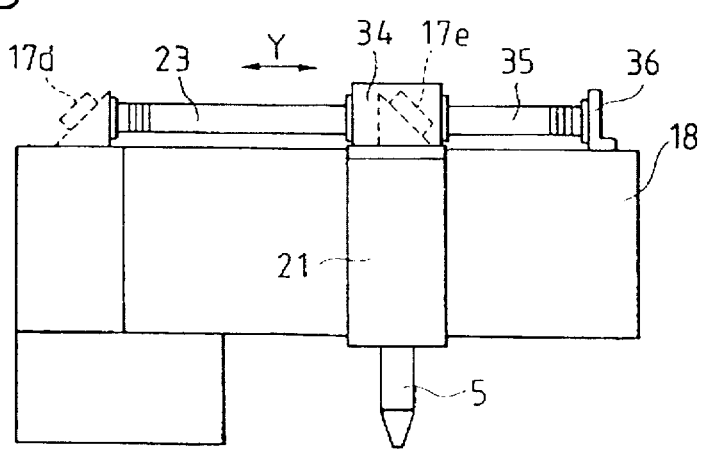
FIG. 3 is a front view showing the details of a counter bellows section in a Y-axis beam path concerned with the first embodiment of the present invention.
Figure 4:
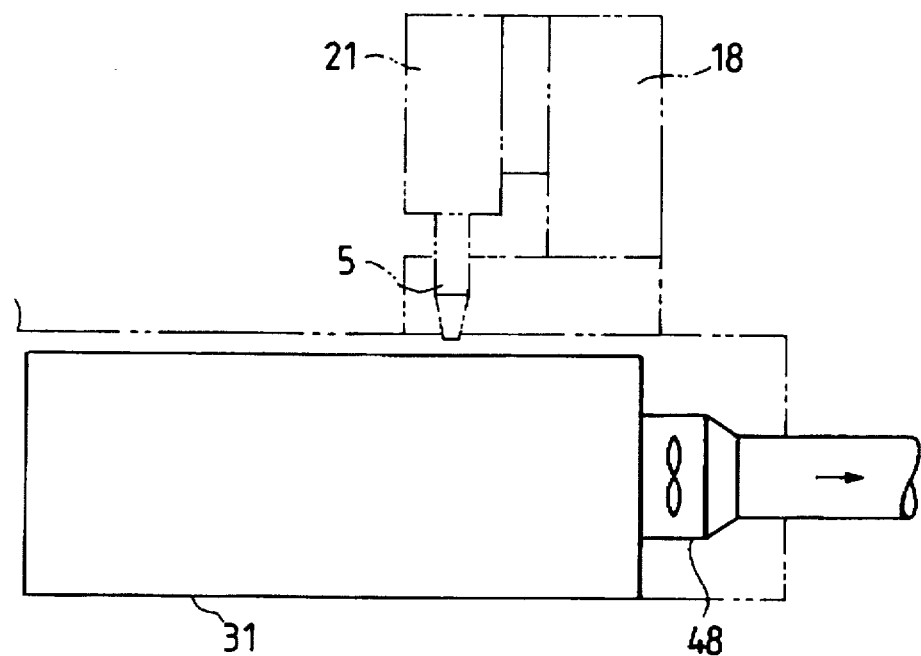
FIG. 4 is a diagram showing the installation of a blower, which renders the internal pressure of a cutting table negative, concerned with the first embodiment of the present invention.
Figure 5:
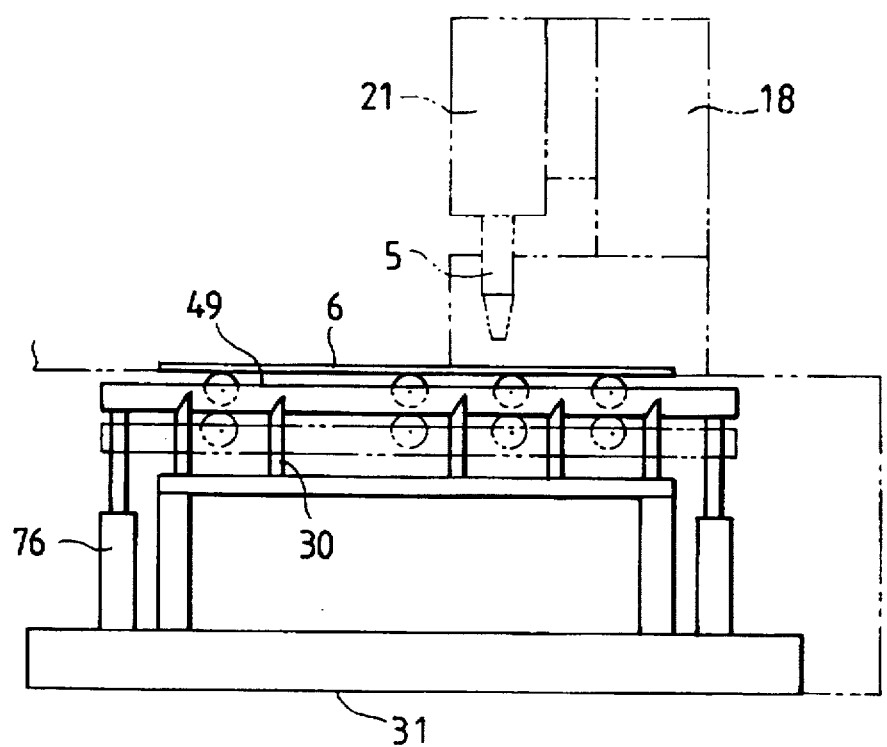
FIG. 5 is a diagram showing the details of a rising roller conveyor, which transfers a workpiece in the X-axis direction, concerned with the first embodiment of the present invention.
Figure 6:
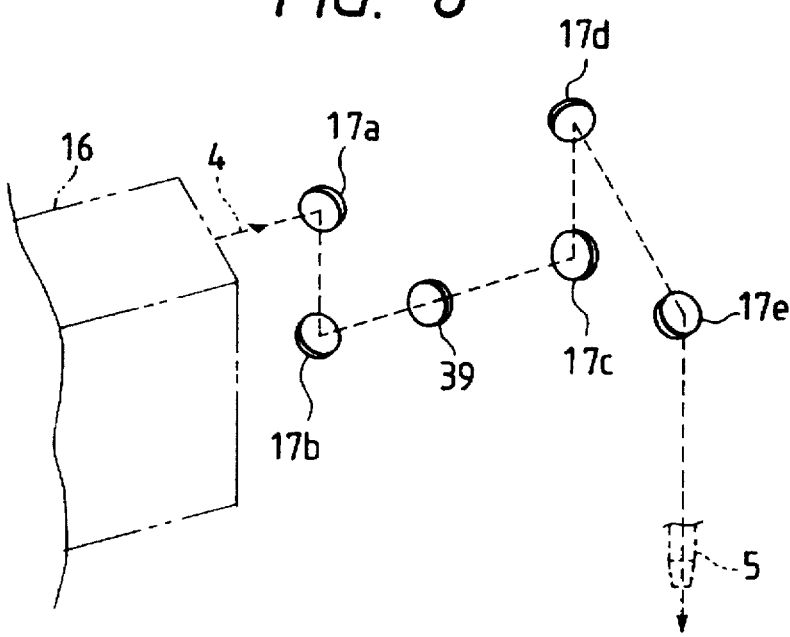
FIG. 6 is a perspective view showing a beam path system arrangement formed by first to fifth bend mirrors and a collimation lens concerned with the first embodiment of the present invention.
Figure 7:
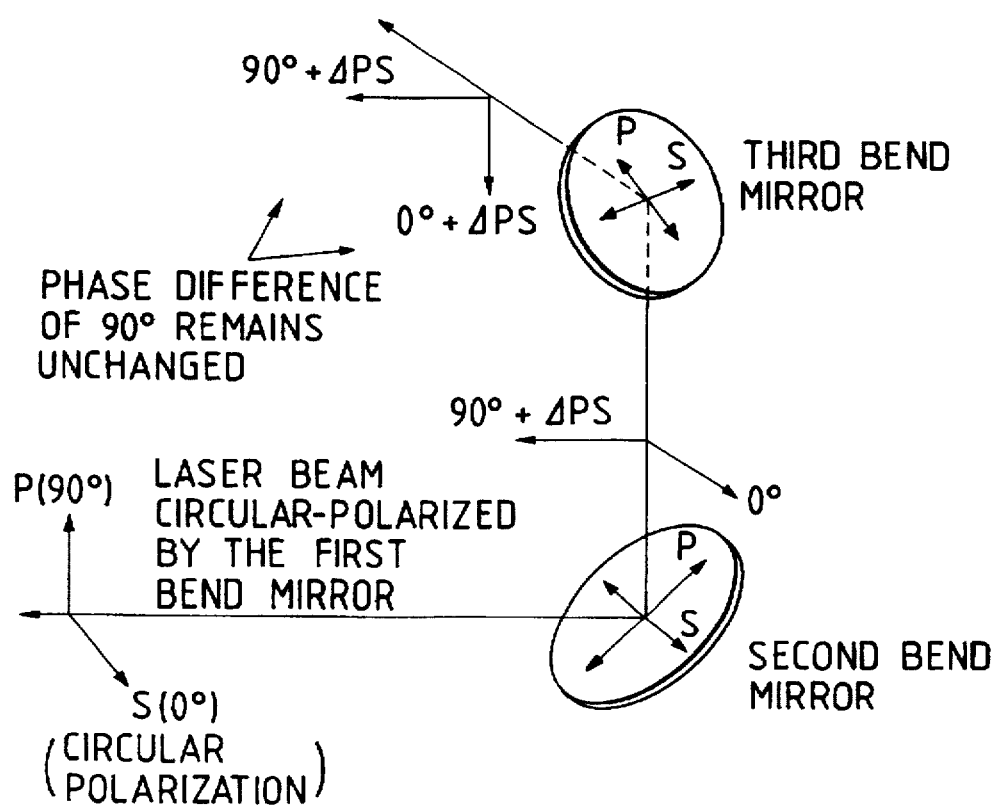
FIG. 7 is a diagram illustrating a principle of counterbalancing phase shift amounts by means of the bend mirrors concerned with the present invention.
Figure 8:
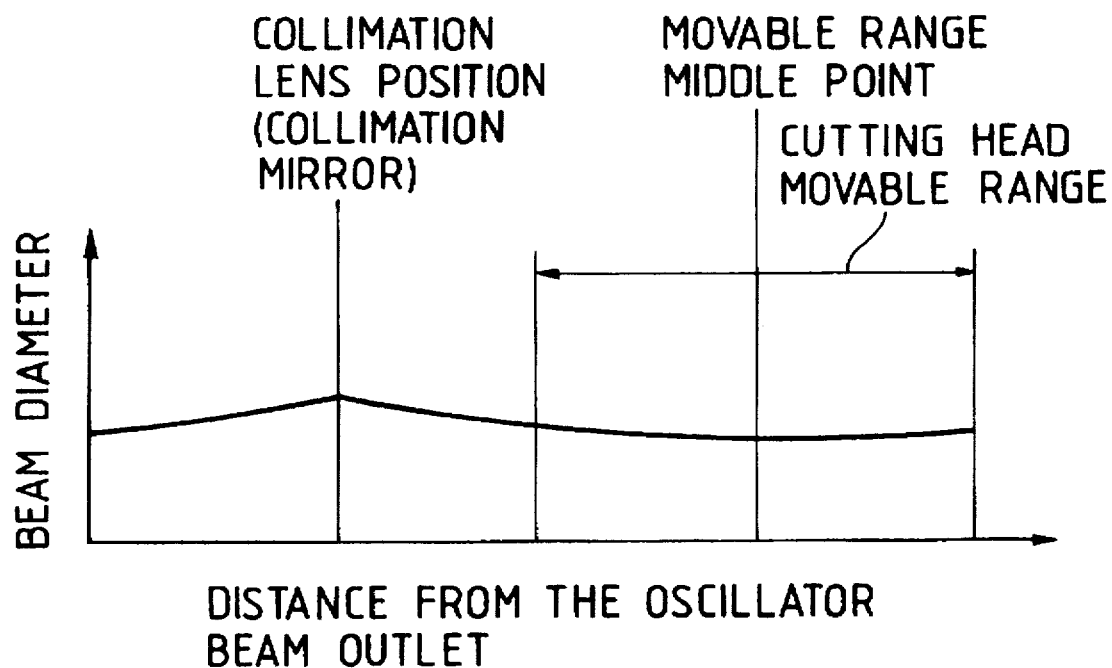
FIG. 8 is a diagram showing a beam propagation characteristic at a time when the collimation lens or a collimation mirror is installed, concerned with the present invention.

A first embodiment of the present invention will now be described with reference to FIGS. 1 to 8. FIG. 1 is a perspective view showing a whole light-scanning laser cutting machine. Some parts and mechanisms that have been omitted from the drawing for the sake of clarity are shown in FIGS. 2 to 5. Namely, FIG. 2 is a perspective view showing the details of the X-, Y- and Z-axis direction moving mechanisms of a first bend mirror, FIG. 3 is a front view showing the details of a counter bellow section of a Y-axis beam path, FIG. 4 shows the installation of a blower which renders the internal pressure of a cutting table negative, and FIG. 5 shows the details of a rising roller conveyor used to transfer a workpiece in the X-axis direction. FIG. 6 is a perspective view showing a beam path system arrangement formed by a first to a fifth bend mirrors and a collimation lens. FIG. 7 is a perspective view illustrating a phase shift amount counterbalancing principle by means of the bend mirrors, and FIG. 8 shows a beam propagation characteristic at a time when the collimation lens or a collimation mirror has been fitted.

Referring to the above drawings, 17a to 17e indicate bend mirrors which include a first bend mirror 17a, a second bend mirror 17b, a third bend mirror 17c, a fourth bend mirror 17d and a fifth bend mirror 17e, which reflect the laser beam output by the laser oscillator 16 to lead it to the cutting head 5. The first bend mirror 17a and the second bend mirror 17b are disposed at the end of the X axis, the third bend mirror 17c and the fourth bend mirror 17d are disposed on a Y arm 18, and further the fifth bend mirror 17e is disposed on the cutting head 5.

The first bend mirror 17a is a circular-polarizing mirror (+90° retarder), and the second bend mirror 17b to the fifth bend mirror 17e are arranged to counterbalance the phase shift amounts of the second bend mirror 17b and the third bend mirror 17c and those of the fourth bend mirror 17d and the fifth bend mirror 17e so that the laser beam 4 circular-polarized by the first bend mirror 17a may be transmitted to the cutting head 5 without the circular polarization factor of the laser beam 4 being reduced. It is to be understood that this phase shift amount counterbalancing principle will be described later mainly in accordance with FIG. 7.

It is also to be understood that the second bend mirror 17b to the fifth bend mirror 17e are constituted by metal mirrors such as copper mirrors that have been in general use.

As shown in FIG. 6, a collimation lens 39 is disposed between the second bend mirror 17b and the third bend mirror 17c and in a position where the laser beam 4 is focused near the middle of the movable range of the cutting head 5.

Also, the first bend mirror 17a has an angle adjusting function and is designed to be movable in the X-, Y- and Z-axis directions as detailed in FIG. 2. In FIG. 2, 70a, 70b and 70c indicate locking screws used to fix members which cause the first bend mirror 17a to move in the X-, Y- and Z-axis directions. 71 designates a Y-axis direction moving member, 72 represents a holder which supports the Y-axis direction moving member 71, 73 denotes a Z-axis direction moving member, and 74 indicates a bend block which holds the first bend mirror 17a.

18 denotes a Y arm which is fixed in the Y-axis direction, is movable in the X-axis direction, and supports on its bases the third bend mirror 17c and the fourth bend mirror 17d as shown in FIG. 1. The Y arm 18 mounted with a Z-axis unit 21, which includes the cutting head 5, movably in the Y-axis direction is thinned at its front end and is also reduced in thickness so that the center-of-gravity position thereof is located between X-axis rails 24a and 24b, independently of the location of the Z-axis unit 21.

A pair of Y-axis rails 19a and 19b are disposed on the Y arm 18, while a pair of Y-axis rail supports 20a and 20b are used to support the Y-axis rails 19a, 19b. A Z-axis unit 21 is fitted to the Y-axis rail supports 20a, 20b so that it is movable on the Y arm 18 in the Y-axis direction, has a function of moving the cutting head 5 up/down, and supports the fifth bend mirror 17e on its top.

A dust-proof Y-axis bellows 22 covers a Y-axis drive (not shown) including the Y-axis rails 19a, 19b and the Y-axis rail supports 20a, 20b. A dust-proof Y-axis beam path bellows 23 covers a Y-axis beam path (between the fourth bend mirror 17d and the fifth bend mirror 17e) and is designed as shown in FIG. 3. Namely, as shown in FIG. 3, the fifth bend mirror 17e is covered with a box 34, a counter bellows 35 secured by a fixing bracket 36 is provided opposite to the Y-axis beam path bellows 23, with the box 34 in between, to make an internal space continuous and to keep the internal pressure of the bellows unchanged when the Z-axis unit moves in the Y direction, thereby preventing surrounding air from being sucked into the bellows.

A pair of X-axis rails 24a and 24b are disposed on the X axis, and X-axis rail supports 25a and 25b are installed on the bottom surface of the Y arm 18 end to hold the X-axis rails 24a, 24b. A dust-proof X-axis bellows 26 covers an X-axis drive (not shown), including the X-axis rails 24a, 24b and the X-axis rail supports 25a, 25b, and an X-axis beam path (between the second bend mirror 17b and the third bend mirror 17c). The X-axis rails 24a, 24b are disposed on a machine base 27, which also supports all components. A rotary table 28, which mainly holds and rotates a cylindrical workpiece 29, is located outside the movable range of the cutting head 5 above a cutting table 31 to allow a large workpiece 6 to be loaded/unloaded without hindrance, and is supported movably up/down by an actuator 75 such as an air cylinder. It will be recognized that this rotary table 28 may be designed to be slid in a retreating direction without being moved up/down and may be separated from the cutting table 31 using a base dedicated to the rotary table 28.

Knife edge-shaped supports 30 are used to hold a flat workpiece 6 and a cutting table 31 is provided with a blower 48, which makes the internal pressure of the cutting table 31 negative, to suck and eject dust, fume, etc., produced during cutting. Also, since this laser cutting machine is of a light-scanning type and its cutting table 31 is independent and fixed, this cutting table 31 can be changed as desired in response to the shape, size and other factors of the workpiece 6. Further, this cutting table 31 is provided with a rising roller conveyor 49, as shown in FIG. 5, which is supported movably up/down by an actuator 75, such as an air cylinder, so that when it is raised after the end of cutting, the workpiece 6 may be raised from the knife edge-shaped supports 30 and moved in the X direction easily by hand. This rising roller conveyor 49 is in a free bearing design so that the workpiece 6 can be moved in any horizontal direction.

The operation and function of this cantilever-type light-scanning laser cutting machine will now be described. Namely, in FIG. 1, the Y arm 18 does not move in the Y-axis direction, and the Z-axis unit 21 moves in the Y-axis direction on the Y-axis rails 19a, 19b disposed on the Y arm 18 by means of the Y-axis rail supports 20a, 20b. The Y arm 18, which is fitted with the X-axis rail supports 25a, 25b on the bottom surface of its end, is capable of moving in the X-axis direction on the X-axis rails 24a, 24b disposed on the machine base 27.

In the meantime, the laser beam 4 output by the laser oscillator 16 is reflected by the bend mirrors 17a to 17e, is collected by the cutting head 5 installed at the bottom of the Z-axis unit 21, and is irradiated onto the workpiece 6 which is held by the knife edge-shaped supports 30. By moving the Z-axis unit 21 in the Y-axis direction and the Y arm 18 in the X-axis direction at this time, the laser cutting head 5 can be moved in any direction on the X–Y plane, whereby the workpiece 6 can be laser-cut into any desired shape.

In this laser cutting machine, the Y arm 18 mounted with the Z-axis unit 21, including the cutting head 5, movably in the Y-axis direction is thinned at the front end and reduced in thickness, whereby the center-of-gravity position thereof is located between the X-axis rails 24a and 24b independently of the location of the Z-axis unit 21. Hence, the load of the Y arm 18 and other parts is applied approximately evenly to the X-axis rails 24a and 24b and to the X-axis rail supports 25a and 25b.

The rotary table 28, on which the cylindrical workpiece 29 can be held and rotated, can be used to assure uniform cutting of the cylindrical workpiece 29. It is to be noted that since cutting height is higher at this time than that in the cutting of the flat workpiece 6, the cutting head 5 is raised by the Z-axis unit 21 before cutting.

The rotary table 28 is disposed outside the movable range of the cutting head 5 so that the large workpiece 6 can be loaded/unloaded without hindrance. The table is further supported by the actuator 75, e.g., an air cylinder, so that it can rise or slide as required in the retreating direction. When the rotary table 28 is not used in laser cutting, therefore, this rotary table 28 can be retracted so that it will not hinder cutting.

It will be appreciated that the rotary table 28 may not be designed to be movable up/down or slidable and may only be disposed outside the movable range of the cutting head 5 to load/unload the large workpiece 6 with little hindrance.

The cutting table 31 is provided with the rising roller conveyor 49 which is moved up/down by the actuator 76, e.g., air cylinder, as shown in FIG. 5, whereby the workpiece 6 can be moved easily by hand in the X-axis direction when the rising roller conveyor 49 is lifted after the end of laser cutting to raise the workpiece 6 from the knife edge-shaped supports 30.

Also, by raising the rising roller conveyor 49 to a position where its rollers are higher than the ends of the knife edge-shaped supports 30 at the time of workpiece 6 loading, the workpiece 6 can also be loaded easily.

To facilitate the adjustment of the circular polarization factor, beam axis, etc., the first bend mirror 17a is a circular-polarizing mirror (+90° retarder) in this laser cutting machine. To transmit the laser beam 4 circular-polarized by the first bend mirror 17a to the cutting head 5, without reducing the circular polarization factor thereof, at the time of laser cutting, the second bend mirror 17b to the fifth bend mirror 17e are arranged to counterbalance the phase shaft amounts of the second bend mirror 17b and the third bend mirror 17c and those of the fourth bend mirror 17d and the fifth bend mirror 17e, whereby the laser beam 4 circular-polarized by the first bend mirror 17a can be transmitted to the cutting head 5, without the circular polarization factor being reduced.

The principle of counterbalancing will be described in accordance with FIG. 7. Immediately after the laser beam 4 has been circular-polarized by the first bend mirror, a phase difference between an S-wave component and a P-wave component is 90°. When the beam is reflected and changed in direction by the second bend mirror, the specific phase shift amount ΔPS° of the bend mirror causes the P-wave component to further lead the S-wave component by ΔPS°. By arranging the third bend mirror so that the S-wave component conversely leads the P-wave component by ΔPS°, however, the laser beam 4 reflected and changed in direction by said third bend mirror has the S-wave component of 0°+ΔPS° and the P-wave component of 90°+ΔPS°, the phase difference between the S- and P-wave components is 90°, and therefore, the circular polarization factor is not reduced.

Because of this counterbalancing principle, the laser beam 4 which is circular-polarized by the first bend mirror 17a is transmitted to the cutting head 5, without its circular polarization factor being reduced, in the mirror arrangement of the present invention.

In Embodiment 1, when the laser beam 4 circular-polarized by the first bend mirror 17a to have the phase difference of 90° between the S- and P-wave components is reflected and changed in direction by the second bend mirror 17b, the specific phase shift amount ΔPS° of the bend mirror causes the P-wave component to further lead the S-wave component by ΔPS°. When the laser beam 4 is further reflected and changed in direction by the third bend mirror 17c, the specific phase shift amount ΔPS° of the bend mirror causes the P-wave component to further lead the S-wave component by ΔPS°. The fourth bend mirror 17d is arranged so that the S-wave component leads the P-wave component by ΔPS° and the fifth bend mirror 17e is arranged so that the S-wave component further leads the P-wave component by ΔPS°. Namely, the fourth bend mirror 17d and the fifth bend mirror 17e are arranged so that the laser beam 4 reflected and changed in direction by the fifth bend mirror 71e has the S-wave component of 0°+2ΔPS° and the P-wave component of 90°+2ΔPS°, i.e., the phase difference between the S- and P-wave components is 90°.

The first bend mirror 17a has an angle adjusting function and is designed to be movable in the X-, Y- and Z-axis directions as detailed in FIG. 2. When the angle of the first bend mirror 17a is changed to adjust the circular polarization factor, therefore, loosening the locking screw 70a allows the first bend mirror 17a to be moved in the X-axis direction and loosening the locking screw 70b allows the Y-axis direction moving member 71 to be moved in the Y-axis direction, whereby the laser beam 4 can be irradiated at the center of the second bend mirror 17b with the circular polarization factor maintaining the best angle.

Also, the first bend mirror 17a is supported by the mechanism movable in the Z-axis direction as detailed in FIG. 2, whereby loosening the locking screw 70c allows the first bend mirror 17a to be easily adjusted in the vertical direction to match the height center of the laser beam 4 after the installation of the laser oscillator 16.

As shown in FIG. 6, the collimation lens 39 in this laser cutting machine is disposed between the second bend mirror 17b and the third bend mirror 17c and in a position where the beam 4 is focused near the middle of the movable range of the cutting head 5, whereby the beam diameter change in the movable range of the cutting head 5 is extremely small as shown in FIG. 8.

Embodiment 2

In Embodiment 1, the second bend mirror 17b to the fifth bend mirror 17e are arranged as described above to counterbalance all the specific phase shift amounts of said second bend mirror 17b to fifth bend mirror 17e, whereby the laser beam 4 circular-polarized by the first bend mirror 17a is transmitted to the cutting head 5 without its circular polarization factor being reduced.

In that arrangement, therefore, the metal mirrors, such as copper mirrors, generally used as the second bend mirror 17b to the fifth bend mirror 17e may be replaced by ES (Enhanced Sliver) coated mirrors or PS (Protected Silver) coated mirrors, which are larger in phase shift amount but higher in reflectance than the metal mirrors generally used. These mirrors can transmit the laser beam 4 circular-polarized by the first bend mirror 17a to the cutting head 5, without its circular polarization factor being reduced (by the principle of counterbalancing the phase shaft amounts described in FIG. 7), and with output damping decreased during the transmission.

Incidentally, when the metal mirrors used as the second bend mirror 17b to the fifth bend mirror 17e are replaced by the ES coated mirrors or PS coated mirrors in a conventional arrangement, wherein the second bend mirror 17b to the fifth bend mirror 17e do not provide a counterbalance of phase shift amounts, output damping can be decreased during the transmission but the circular polarization factor is reduced during the transmission to the cutting head 5 because of the large phase shift amounts of the ES coated mirrors or the PS coated mirrors.

Embodiment 3

Figure 9:
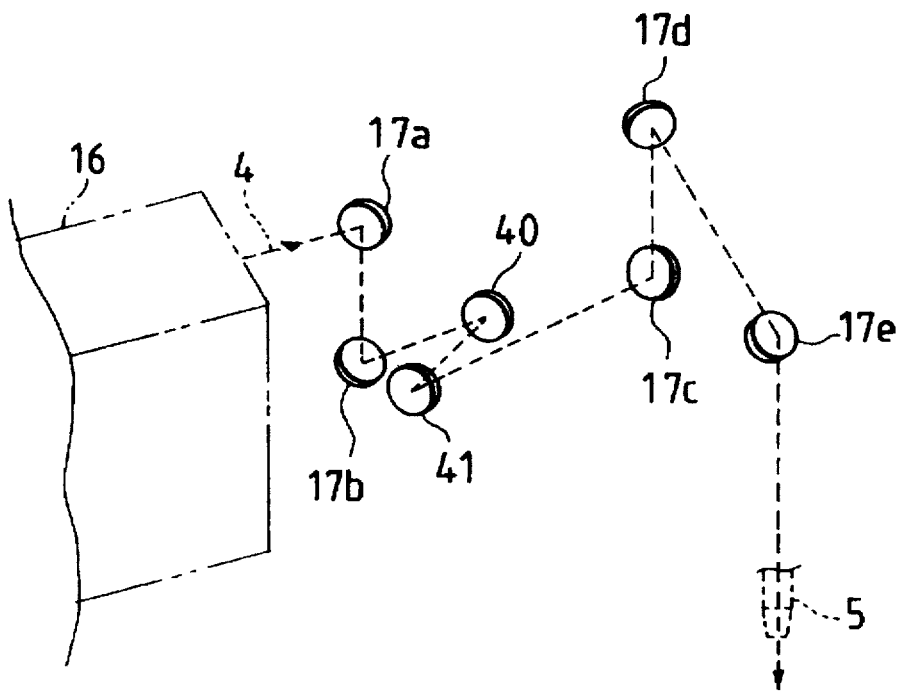
FIG. 9 is a perspective view showing a beam path system arrangement at a time when a collimation mirror is installed, concerned with a third embodiment of the present invention.

In Embodiment 1, the collimation lens 39 is disposed between the second bend mirror 17b and the third bend mirror 17c and in a position where the beam 4 is focused near the middle of the movable range of the cutting head 5 as shown in FIG. 6. Instead of the collimation lens 39, a plane mirror 40 and a collimation mirror 41 may be disposed between the second bend mirror 17b and the third bend mirror 17c and in a position where the beam 4 is focused near the middle of the movable range of the cutting head 5 as shown in FIG. 9 to extremely reduce the beam diameter change in the movable range of the cutting head 5 as shown in FIG. 8.

Embodiment 4

Figure 10:
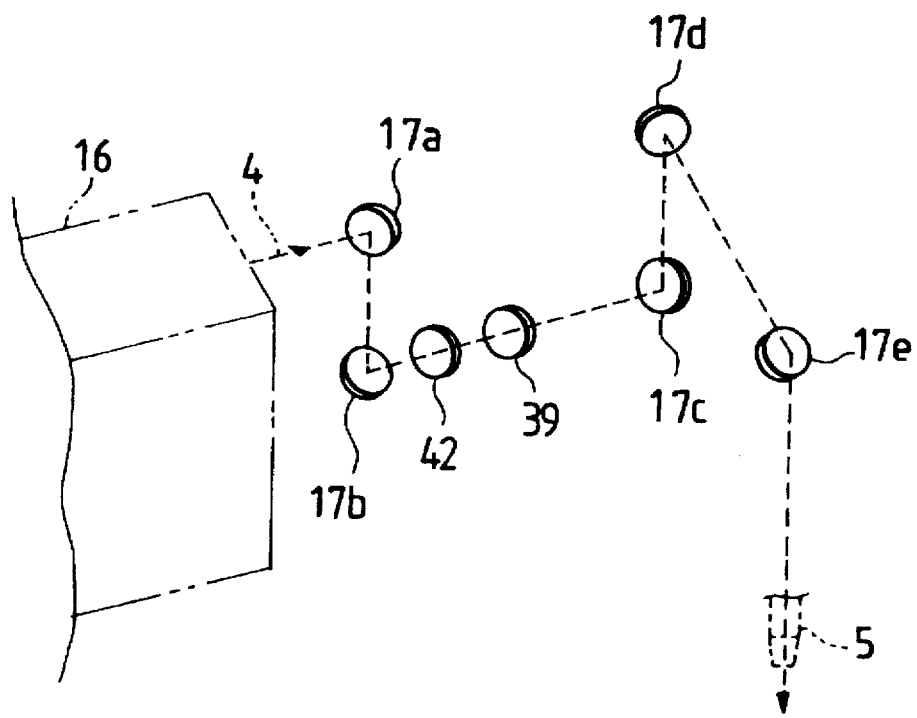
FIG. 10 is a perspective view showing a beam path system arrangement at a time when a concave lens is installed between an oscillator beam outlet and the collimation lens, concerned with a fourth embodiment of the present invention.
Figure 11:
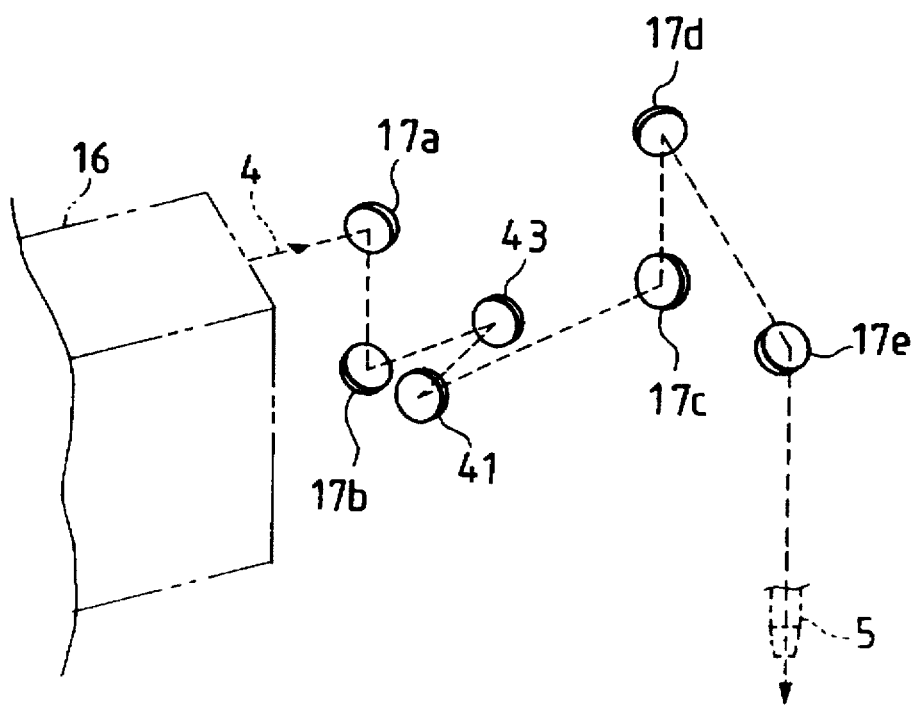
FIG. 11 is a diagram showing a beam propagation characteristic at a time when a convex mirror is installed between the oscillator beam outlet and the collimation mirror, concerned with the fourth embodiment of the present invention.
Figure 12:
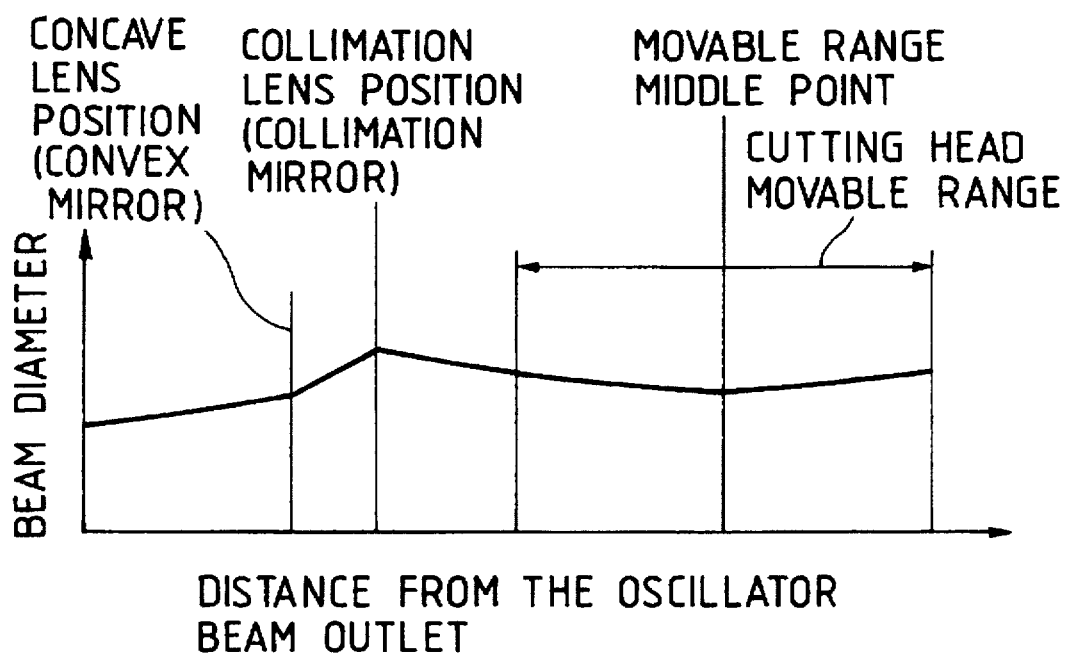
FIG. 12 is a diagram showing a beam propagation characteristic at a time when the concave lens or the convex mirror is installed between the oscillator beam outlet and the collimation lens or the collimation mirror, concerned with the fourth embodiment of the present invention.

A concave lens 42 may be provided between the second bend mirror 17b and the collimation lens 39 as shown in FIG. 10 or the plane mirror 40 may be replaced by a convex lens 43 as shown in FIG. 11 to expand the laser beam 4 in order to focus the laser beam near the middle of the movable range of the cutting head 5 as shown in FIG. 12, whereby the beam diameter change in the movable range of the cutting head 5 can be reduced and the condensing diameter can be decreased because of the large beam diameter.

Embodiment 5

Figure 13:
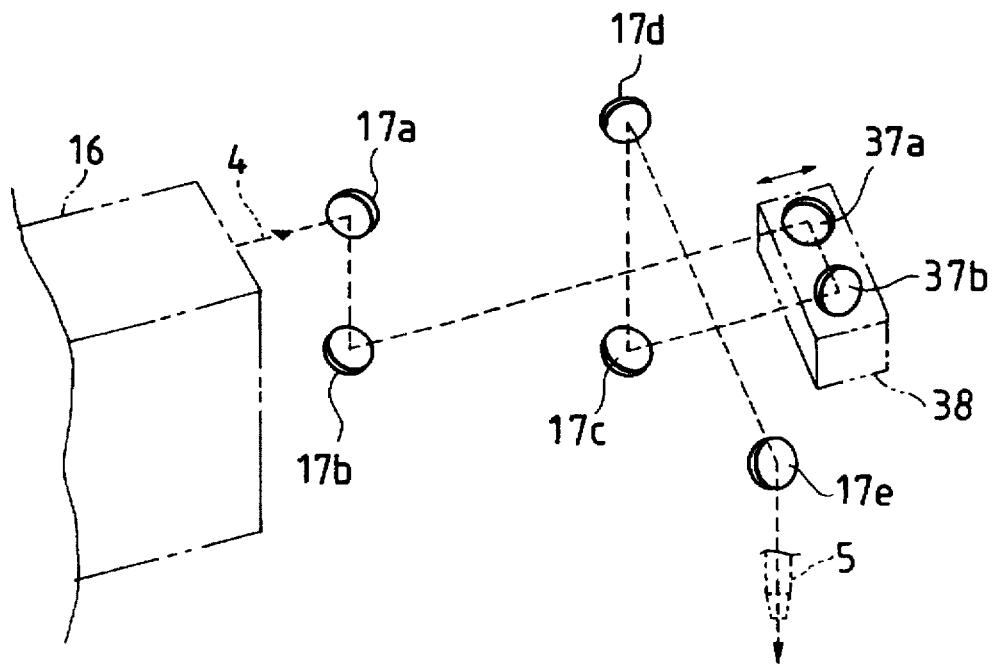
FIG. 13 is a perspective view showing a beam path system arrangement having a uniform beam path length, concerned with a fifth embodiment of the present invention.

When the first bend mirror 17a and the second bend mirror 17b are moved in the Y direction and an inverting mirror box 38 containing a pair of inverting mirrors 37a, 37b is provided between the second bend mirror 17b and the third bend mirror 17c reversed and is designed to be moved in the X direction by the half of the X-direction moving distance of the Y arm 18 as shown in FIG. 13, the transmission distance of the laser beam 4 from the first bend mirror 17a to the fourth bend mirror 17d can be made uniform, whereby the beam diameter change of the laser beam 4 due to the X-direction movement of the Y arm 18 is eliminated.

Embodiment 6

Figure 14:
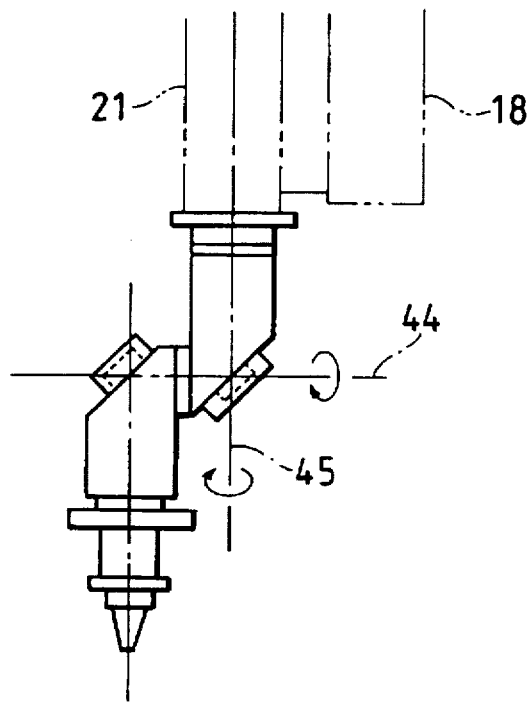
FIG. 14 is a diagram showing a three-dimensional cutting head equipped with a two-axis rotation mechanism, concerned with a sixth embodiment of the present invention.
Figure 15:
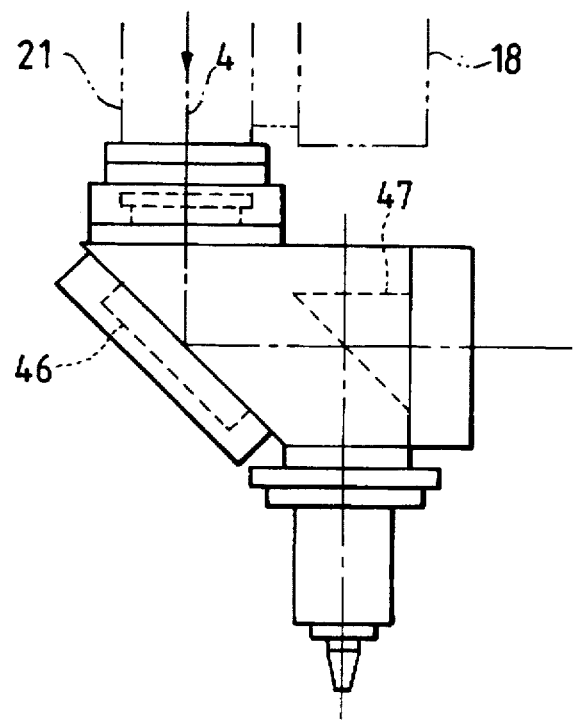
FIG. 15 is a diagram showing a parabolic mirror type cutting head for welding, concerned with the sixth embodiment of the present invention.

The Y arm 18 may be made of a high mechanical strength material or designed to have high mechanical strength to replace the cutting head 5 with a three-dimensional cutting head equipped with a two-axis rotation mechanism having rotary axes 44, 45 as shown in FIG. 14 or with a cutting head for welding or surface modification (e.g., a parabolic mirror type cutting head, a beam scanner type cutting head, an integration mirror type cutting head, a kaleidoscope type cutting head or the like) as shown in FIG. 15. The replaceability of the cutting head in this embodiment with the three-dimensional cutting head equipped with the two-axis rotation mechanism allows a three-dimensional workpiece to be cut, and the replaceability thereof with the cutting head for welding or surface modification allows a workpiece to be welded or surface modified.

FIG. 15 shows the parabolic mirror type cutting head among the cutting heads for welding or surface modification, wherein the laser beam 4 reflected by the plane mirror 46 is condensed by a parabolic mirror 47 irradiated on the workpiece.

Embodiment 7

Figure 16:
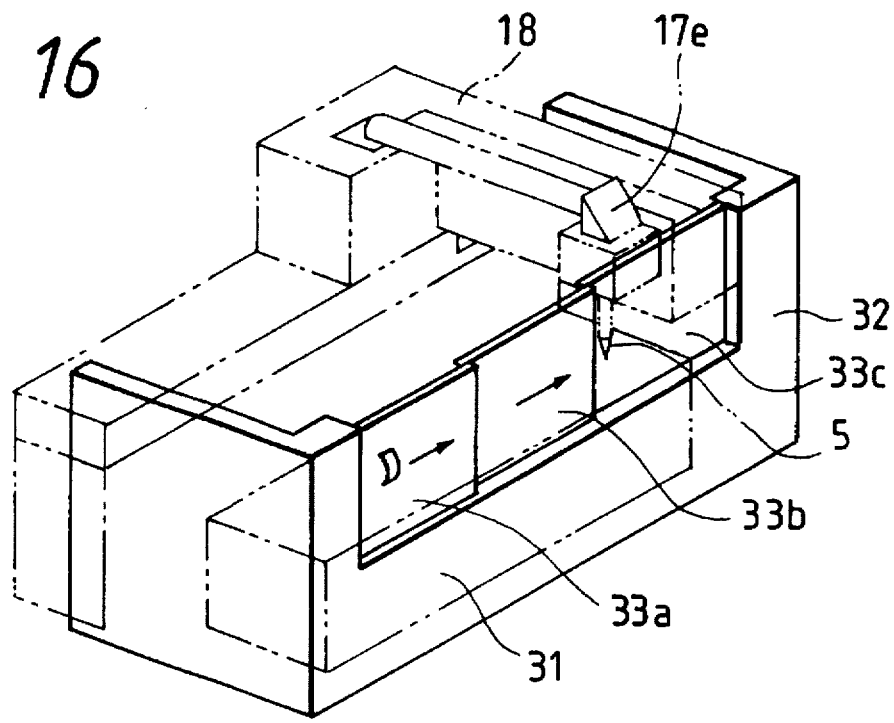
FIG. 16 is a perspective view showing the installation of a safety guard concerned with a seventh embodiment of the present invention.
Figure 17:
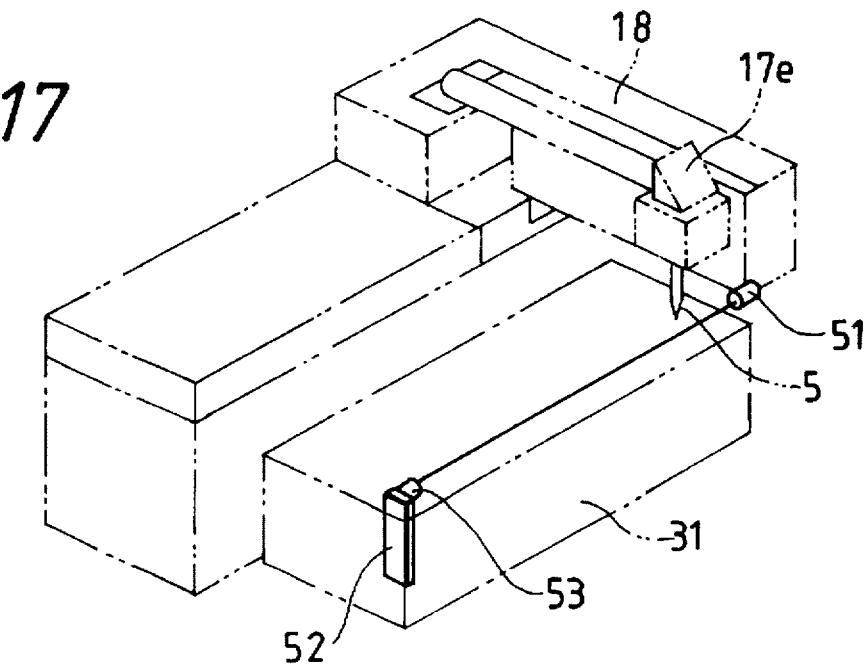
FIG. 17 is a diagram showing a modification to the seventh embodiment of the present invention.

As shown in FIG. 16, a safety guard 32 which covers the Y arm 18 and the cutting table 31 may be provided, and a workpiece 6 or 29 loading/unloading area may be constituted by transparent doors 33 made of a material which absorbs the laser beam, e.g., an acrylic material, to permit inside observation and to prevent a light reflected by the workpiece during cutting from being irradiated to the outside. In this case, the workpiece 6 or 29 can be loaded/unloaded by sliding the transparent doors 33a, 33b in the direction of arrow in the figure to the position of the transparent door 33c.

The safety measures shown in FIG. 16 may be provided with an interlock to keep the machine from being operated when the transparent doors 33 are open. When the transparent doors 33 cannot be provided, a photoelectric tube 51 may be fitted to the front end of the Y arm 18 and a holding stay 52 be fitted with a light-receiving sensor 53, which receives the light of the photoelectric tube 51, to provide an interlock to stop the machine depending on the presence/absence of the light to the light-receiving sensor 53 when an operator has accidentally entered the movable range of the Y arm 18.

Embodiment 8

Figure 18:
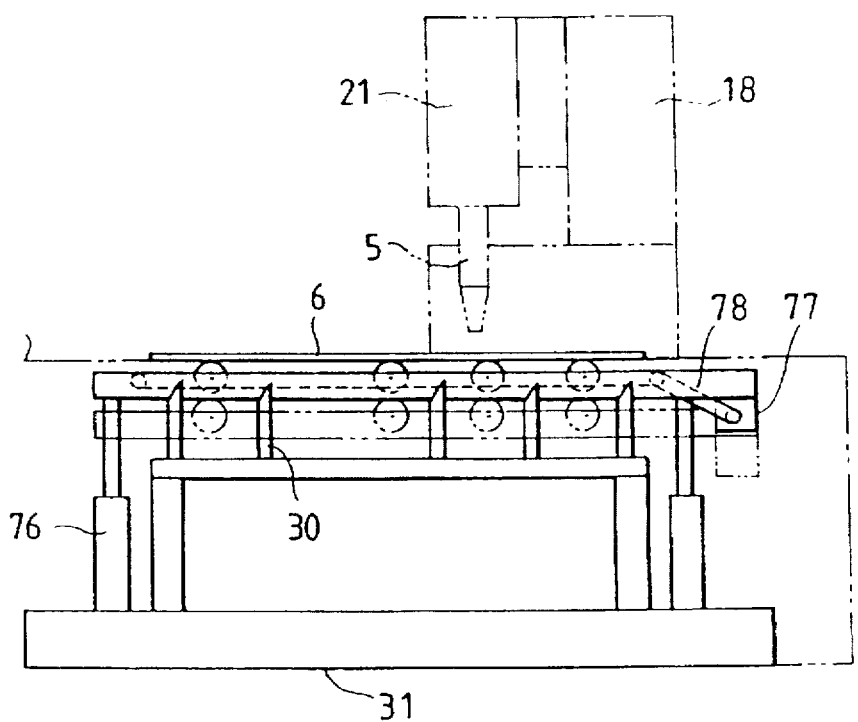
FIG. 18 is a diagram showing the details of the rising roller conveyor which transfers the workpiece in the X-axis direction, concerned with the eighth embodiment of the present invention.
Figure 19:
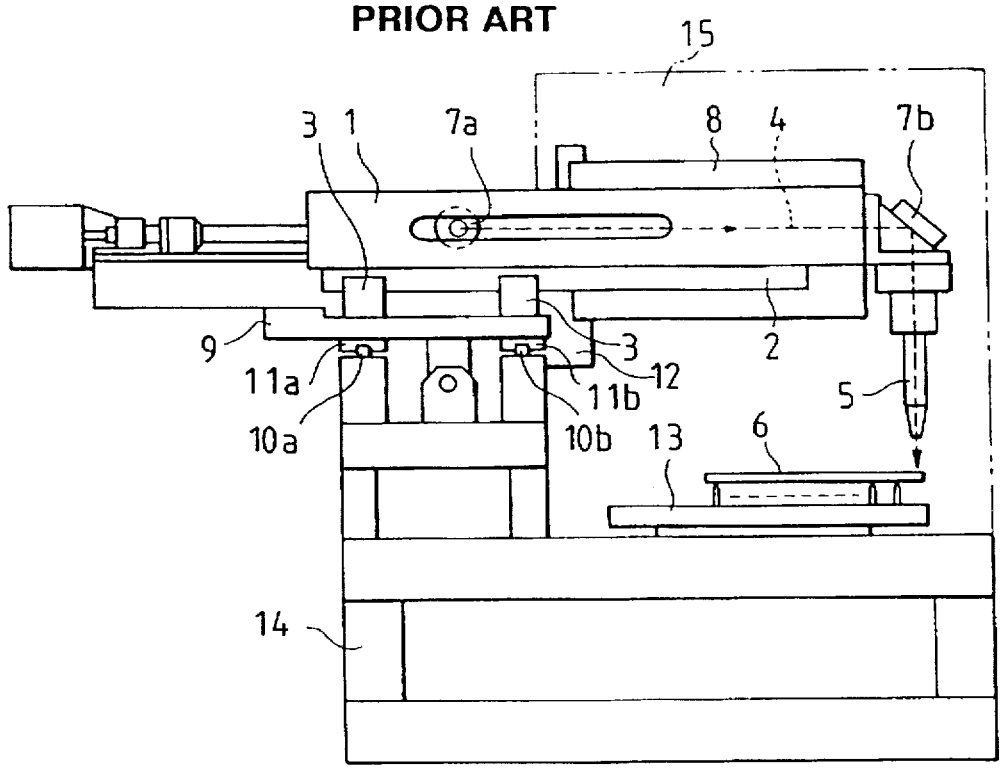
FIG. 19 is a front view showing a conventional cantilever type light-scanning laser cutting machine.
Figure 20:
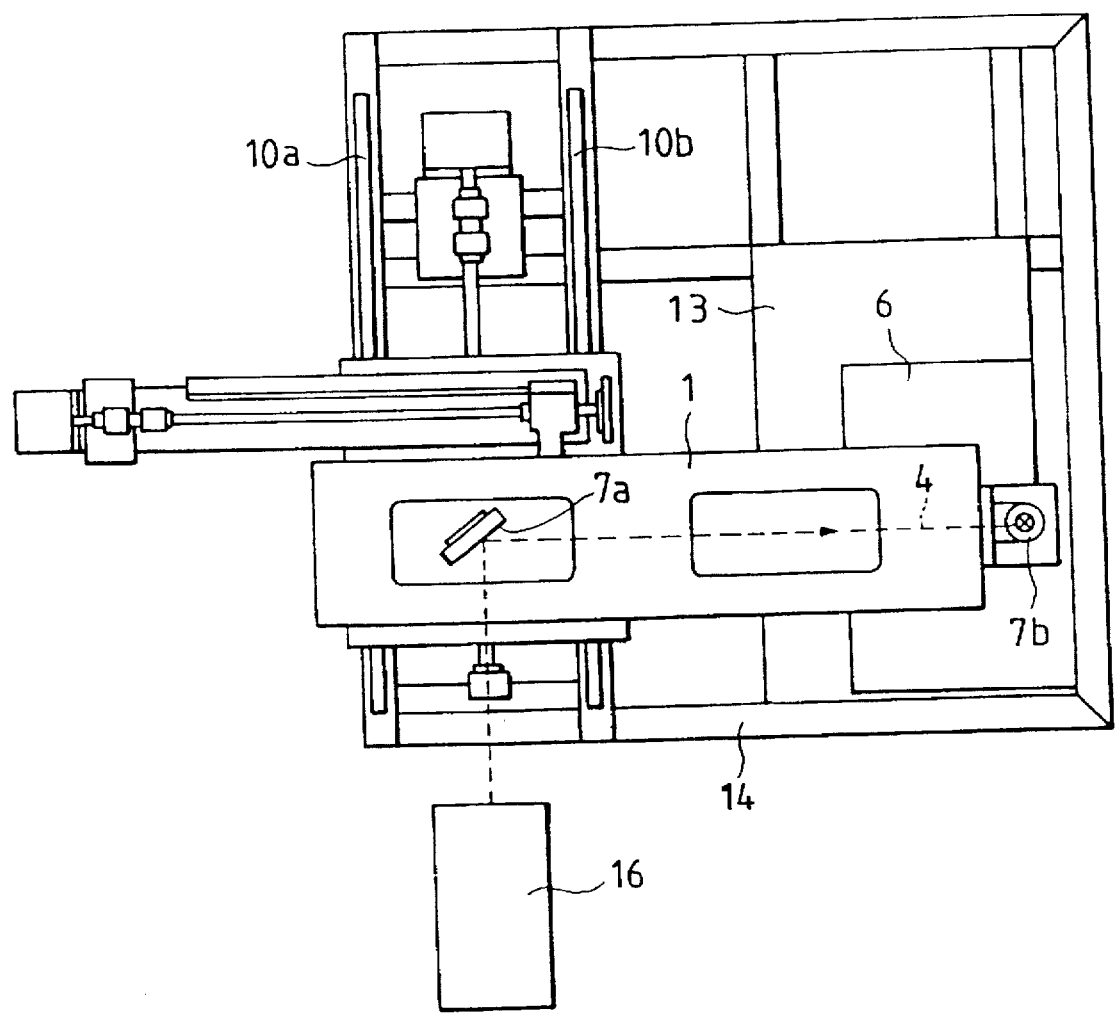
FIG. 20 is a plan view showing a conventional cantilever type light-scanning laser cutting machine.

In Embodiment 1, the rising roller conveyor 49 may be provided with a roller drive motor 77 to drive the rollers via a chain 78 as shown in FIG. 18, whereby the workpiece 6 can be transferred automatically.

Further, the present invention allows the above embodiments to be combined as appropriate to constitute several different laser cutting machine designs.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A laser cutting machine for irradiating a moveable laser beam onto a workpiece to cut the workpiece, comprising:
   a laser oscillator for providing said laser beam;
   a first rail structure comprising a pair of parallel rails disposed to define a first axis; an arm provided movably in the direction of said first axis on said first rail structure;
   a second rail structure disposed on said arm to define a second axis, said second axis being perpendicular on a plane to said first axis;
   a cutting head provided movably on said second rail structure in the direction of said second axis;
   a first bend mirror disposed on said first axis for receiving said laser beam output by said laser oscillator;
   a second bend mirrors disposed on said first axis for receiving said laser beam reflected by said first mirror;
   a third bend mirror and a fourth bend mirror provided on said arm; and
   a fifth bend mirror provided on said cutting head;
   wherein said first, second, third, fourth and fifth bend mirrors define a laser beam path, and the center-of-gravity position of said arm is located between said pair of rails disposed on said first axis wherein said first bend mirror is a circular-polarizing mirror and said second to fifth bend mirrors are disposed to counterbalance phase shift amounts specific to said second to fifth bend mirrors.

2. The laser cutting machine as defined in claim 1, wherein said first bend mirror is at least supported movably in the direction of a third axis perpendicular to said second axis.

3. The laser cutting machine as defined in claim 1 further comprising a rotary table, wherein said rotary table is provided outside the movable range of said cutting head.

4. The laser cutting machine as defined in claim 3, wherein said rotary table comprises a table body and further comprises means for moving said rotary table body in at least one of an up/down or sliding movement.

5. The laser cutting machine as defined in claim 1, further comprising a cutting table for receiving a workpiece, said table being provided with a rising roller conveyor.

6. The laser cutting machine as defined in claim 5, further comprising means for drivingly rotating the rollers of said rising roller conveyor.

7. The laser cutting machine as defined in claim 1, wherein said first bend mirror provides a laser beam circular polarized to have a phase difference of 90° between S- and P-wave components, and wherein further phase shift amounts $\Delta PS°$ of the said second and third bend mirrors cause one of the P-wave component and S-wave components to further lead the other wave component and wherein said fourth and fifth bend mirrors cause the other wave component to further lead the one of the P-wave and S-wave components.

8. The laser cutting machine as defined in claim 7, wherein said phase shifts of said second and third bend mirrors are each by $\Delta PS°$, and wherein said subsequent further reflection by each of said fourth and fifth mirrors are each by $\Delta PS°$.

9. The laser cutting machine as defined in claim 8 wherein the fourth bend mirror is arranged so that the S-wave component leads the P-wave component by $\Delta PS°$ and the fifth bend mirror is arranged so that the S-wave component further leads the P-wave component by $\Delta PS°$, and wherein the fourth and fifth bend mirrors are arranged so that the laser beam if reflected and changed in direction by the fifth bend mirror, has a S-wave component of $0°+2\Delta PS°$ and the P-wave component has $90°+2\Delta PS°+90°\Delta$.

10. A laser cutting machine comprising:

a laser oscillator for providing a linear-polarized laser beam that defines a first axis line;

a first bend mirror for receiving said linear-polarized laser beam and being disposed on a first plane intersecting said first axis line of said laser beam;

a second bend mirror for receiving laser light reflected by said first bend mirror and being disposed with respect to said first bend mirror on the intersecting portion of said first plane and a second plane intersecting said first plane;

a third bend mirror for receiving laser light reflected by said second bend mirror and being disposed with respect to said second mirror on the intersecting portion of said second plane and a third plane intersecting said second plane;

a fourth bend mirror for receiving laser light reflected by said third bend mirror and being disposed with respect to said third bend mirror on the intersecting portion of said third plane and a fourth plane intersecting said third plane; and a fifth bend mirror for receiving laser light reflected by said fourth bend mirror and being disposed with respect to said fourth bend mirror on the intersecting portion of said fourth plane and a fifth plane intersecting said fourth plane;

whereby a beam axis is formed on each of said first, second, third, fourth and fifth planes, and in which a beam axis distance between said second bend mirror and third bend mirror and a beam axis distance between said fourth bend mirror and fifth bend mirror change, wherein said first bend mirror is a circular-polarizing mirror and said second to fifth bend mirrors are disposed to counterbalance phase shift amounts specific to said second to fifth bend mirrors.

11. The laser cutting machine as defined in claim 10, further comprising X–Y travel adjustment means for supporting said first bend mirror.

12. The laser cutting machine as defined in claim 11, wherein the second to the fifth bend mirrors are ES or PS coated mirrors.

13. The laser cutting machine as defined in claim 10, wherein the second to the fifth bend mirrors are ES or PS coated mirrors.

* * * * *

UNITED STATES PATENT AND TRADEMARK OFFICE
CERTIFICATE OF CORRECTION

PATENT NO. : 5,637,243
DATED : June 10, 1997
INVENTOR(S) : Kiyoshi SATO et al.

It is certified that error appears in the above-indentified patent and that said Letters Patent is hereby corrected as shown below:

Col. 12, line 64, delete "said" and insert --further--;

Col. 12, line 64, delete "shifts" and insert --shift amounts--;

Col. 12, line 64, delete "of said second and third bend";

Col. 12, line 65, delete "mirrors are each by ΔPS°, and wherein said subsequent";

Col. 12, line 66, delete "further reflection by each";

Col. 12, line 67, delete "by";

UNITED STATES PATENT AND TRADEMARK OFFICE
CERTIFICATE OF CORRECTION

PATENT NO. : 5,637,243
DATED : June 10, 1997
INVENTOR(S) : Kiyoshi Sato et al

It is certified that error appears in the above-indentified patent and that said Letters Patent is hereby corrected as shown below:

Col. 13, line 7, delete "if reflected" and insert --reflected--;

Col. 13, line 8, delete ".";

Col. 13, line 9, delete "the" and insert --a--;

Col. 13, line 9, delete "has" and insert --of--;

Col. 13, line 9, delete "+";

Col. 13, line 10, delete "90°Δ".

Signed and Sealed this

Sixteenth Day of September, 1997

Attest:

BRUCE LEHMAN

*Attesting Officer*  *Commissioner of Patents and Trademarks*